US009563110B2

(12) United States Patent
Ueda (10) Patent No.: US 9,563,110 B2
(45) Date of Patent: Feb. 7, 2017

(54) LIGHT SOURCE UNIT HAVING WAVELENGTH CONVERSION MEMBER AND PROJECTOR

(71) Applicant: CASIO COMPUTER CO., LTD., Shibuya-ku, Tokyo (JP)

(72) Inventor: Tomoyuki Ueda, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 56 days.

(21) Appl. No.: 14/636,925

(22) Filed: Mar. 3, 2015

(65) Prior Publication Data

US 2015/0252978 A1    Sep. 10, 2015

(30) Foreign Application Priority Data

Mar. 4, 2014    (JP) .................................. 2014-041115

(51) Int. Cl.
*G03B 21/20*    (2006.01)
*F21K 99/00*    (2016.01)
(Continued)

(52) U.S. Cl.
CPC ............... *G03B 21/204* (2013.01); *F21K 9/00* (2013.01); *F21V 9/08* (2013.01); *F21V 9/16* (2013.01); *G02B 6/0003* (2013.01)

(58) Field of Classification Search
CPC ................ F21K 9/00; F21V 9/08; F21V 9/16; G02B 6/0003; G03B 21/204
See application file for complete search history.

(56) References Cited

U.S. PATENT DOCUMENTS 6,739,723 B1 * 5/2004 Haven .................... H04N 9/315
                                                       348/790
8,348,432 B2    1/2013 Miyazaki
(Continued)

FOREIGN PATENT DOCUMENTS

CN        101681080 A      3/2010
CN        102830582 A     12/2012
(Continued)

OTHER PUBLICATIONS

Chinese Office Action (and English translation thereof) dated May 3, 2016, issued in counterpart Chinese Application No. 201510090708.5.

*Primary Examiner* — Sultan Chowdhury
*Assistant Examiner* — Magda Cruz
(74) *Attorney, Agent, or Firm* — Holtz, Holtz & Volek PC (57) ABSTRACT

There is provided a light source unit which includes an excitation light source configured to emit light in a first wavelength range, a wavelength conversion member on which the light in the first wavelength range is incident from an incident side thereof and which is made up of a member formed to include a luminescent material mixed therein which emits light in a second wavelength range having its wavelength peak on a longer wavelength side than a wavelength peak of the light in the first wavelength range, and a first optical filter which is provided at an output side of the wavelength conversion member which lies opposite to the incident side and which transmits a light component of the light in the second wavelength range which has a wavelength shorter than a third wavelength lying in a wavelength range of the light in the second wavelength range.

20 Claims, 8 Drawing Sheets

(51) Int. Cl.
   *F21V 9/08*   (2006.01)
   *F21V 9/16*   (2006.01)
   *F21V 8/00*   (2006.01)

(56) References Cited

U.S. PATENT DOCUMENTS

| 8,662,673 | B2 | 3/2014 | Miyazaki |
| 2009/0219958 | A1 | 9/2009 | Mizushima et al. |
| 2013/0229634 | A1* | 9/2013 | Hu ........................ G03B 21/204 |
| | | | 353/84 |

FOREIGN PATENT DOCUMENTS

| JP | 2011013320 A | 1/2011 |
| WO | 2009093431 A1 | 7/2009 |
| WO | 2013181903 A1 | 12/2013 |

\* cited by examiner

LIGHT SOURCE UNIT HAVING WAVELENGTH CONVERSION MEMBER AND PROJECTOR

CROSS-REFERENCE TO RELATED APPLICATION

This patent application is based upon and claims the benefit of priority under 35 USC 119 from the prior Japanese Patent Application No. 2014-41115 filed on Mar. 4, 2014, the entire disclosure of which, including the description, claims, drawings and abstract, is incorporated herein by reference.

BACKGROUND OF THE INVENTION

Field of the Invention

The present invention relates to a light source unit having a wavelength conversion member and a projector including this light source unit.

Description of the Related Art

In these days, data projectors are used on many occasions as an image projection system which projects an image of a screen of a personal computer or a video image, as well as images based on image data which is stored on a memory card on to a screen. In these data projectors, light emitted from a light source is caused to converge to a micromirror display device called a DMD (Digital Micromirror Device) or a liquid crystal panel so that a full-color image is displayed onto a screen.

In addition, the application of such projectors is expanding widely from commercial presentation to domestic use as video equipment including personal computers, DVD players and the like has been used generally. Conventionally, the mainstream of these projectors has been those which utilize a high-intensity discharge lamp as a light source. In recent years, however, there have been made many developments and proposals on light source units which use, as a light source, a plurality of semiconductor light emitting elements such as laser diodes and which include a plurality of optical parts such as lenses, mirrors and the like in association with the use of such semiconductor light emitting elements.

For example, a light source unit of a projector which is disclosed in Japanese Unexamined Patent Publication No. 2011-13320 (JP-A-2011-13320) has a blue laser oscillator as a light source of light in the blue wavelength range, a red light emitting diode as alight source of light in the red wavelength range and a luminescent wheel device which includes a luminescent wheel having laid out thereon a luminescent material layer which emits light in the green wavelength range using, as excitation light, light emitted from a blue laser oscillator which is a light source of light in the blue wavelength range. The luminescent wheel includes a diffuse transmission area which transmits light emitted from the blue laser oscillator while diffusing the light. The light in the blue wavelength range which passes through the diffuse transmission area is shone on to the display device as a light source together with light in the red wavelength range and light in the green wavelength range, and projected light from the display device is projected on to a screen.

The blue laser oscillator (the blue laser diode) used in the projector disclosed in JP-A-2011-13320 is configured to be suitable for the projector as it is made to exhibit a high light output and to cause light in the green wavelength range to be emitted efficiently. It is understood that the wavelength of light emitted from this blue laser oscillator is close to about 450 nm. In case light whose wavelength is close to about 450 nm is projected on to a screen as a light source, projected light which should be blue looks slightly purplish, leading from time to time a problem that the color tone of a projected image becomes unnatural.

Consequently, an object of the invention is to provide a light source unit which can project an image with a proper color tone on to a screen when a blue laser diode is used as a light source and a projector which uses this light source unit.

SUMMARY OF THE INVENTION

According to an aspect of the invention, there is provided a light source unit including an excitation light source configured to emit light in a first wavelength range, a wavelength conversion member on which the light in the first wavelength range is incident from an incident side thereof and which is made up of a member formed to include a luminescent material mixed therein which emits light in a second wavelength range having its wavelength peak on a longer wavelength side than a wavelength peak of the light in the first wavelength range, and a first optical filter which is provided at an output side of the wavelength conversion member which lies opposite to the incident side and which transmits a light component of the light in the second wavelength range which has a wavelength shorter than a third wavelength lying in a wavelength range of the light in the second wavelength range.

According to another aspect of the invention, there is provided a projector including a light source unit, a display device configured to form image light, a light source side optical system configured to guide light from the light source unit to the display device, a projection side optical system configured to project the image light emitted from the display device on to a screen, and a projection control unit configured to control the display device and the light source unit, wherein the light source unit includes an excitation light source configured to emit light in a first wavelength range, a wavelength conversion member which is formed to include a luminescent material mixed therein which emits light in a second wavelength range having its wavelength peak on a longer wavelength side than a wavelength peak of the light in the first wavelength range, and a first optical filter which is provided at an output side of the wavelength conversion member from which the light in the first wavelength range and the light in the second wavelength range which pass through the wavelength conversion member emerge and which transmits the light in the first wavelength range and part of the light in the second wavelength range which have wavelengths shorter than a third wavelength lying in a wavelength range of the light in the second wavelength range.

According to a further aspect of the invention, there is provided a projector including a light source unit, a display device configured to form image light, a light source side optical system configured to guide light from the light source unit to the display device, a projection side optical system configured to project the image light emitted from the display device on to a screen, and a projection control unit configured to control the display device and the light source unit, the light source unit including an excitation light source configured to emit light in a first wavelength range, a wavelength conversion member which is formed to include a luminescent material mixed therein which emits light in a second wavelength range having its wavelength peak on a longer wavelength side than a wavelength peak of the light in the first wavelength range, and a first optical filter which is provided at an output side of the wavelength conversion member from which the light in the first wavelength range and the light in the second wavelength range which pass through the wavelength conversion member emerge and which transmits the light in the first wavelength range and part of the light in the second wavelength range which have wavelengths shorter than a third wavelength lying in a wavelength range of the light in the second wavelength range, wherein the excitation light source includes a blue laser diode, wherein the light in the first wavelength range includes light in the blue wavelength range, wherein the light in the second wavelength range includes luminescent light from the luminescent material, and wherein the wavelength conversion member has at an incident side thereof on which the light in the first wavelength range is incident a second optical filter configured to transmit light having a wavelength shorter than a fourth wavelength which is a wavelength shorter than the third wavelength.

BRIEF DESCRIPTION OF THE SEVERAL VIEWS OF THE DRAWINGS

FIG. 5A and FIG. 5B show schematic sectional views showing a wavelength conversion member of the projector according to the embodiment of the invention, of which FIG. 5A is a vertical sectional view and FIG. 5B is a cross-sectional view of the wavelength conversion member.

FIG. 7 is a diagram showing a transmission spectrum of a first optical filter and a second optical filter and a light distribution spectrum of light in the blue wavelength range and light in the green wavelength range which adjusts the color tone in the projector according to the embodiment of the invention and FIG. 8A and FIG. 8B show schematic diagrams showing a wavelength conversion member of a projector according to another embodiment of the invention, of which FIG. 8A is a vertical sectional view and FIG. 8B is a cross-sectional view of the wavelength conversion member.

DETAILED DESCRIPTION OF THE PREFERRED EMBODIMENTS

Hereinafter, a best mode for carrying out the invention will be described by the use of the accompanying drawings. Although the following embodiments have various preferred technical limitations for carrying out the invention, those technical limitations are not intended to limit the scope of the invention to the embodiments.

Figure 1:
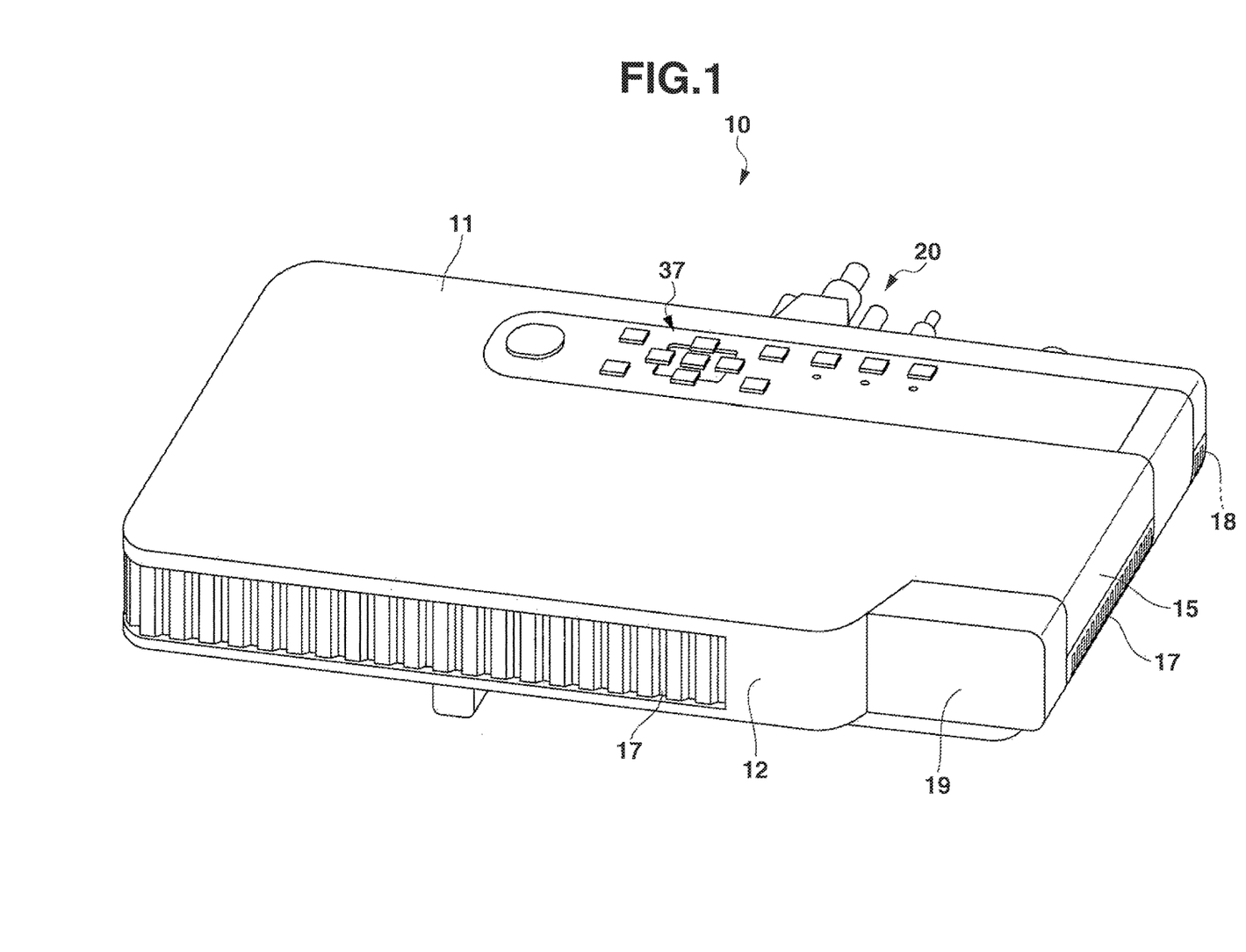
FIG. 1 is an external perspective view showing a projector according to an embodiment of the invention.

Hereinafter, embodiments of the invention will be described in detail based on the drawings. FIG. 1 is an external perspective view of a projector 10 according to an embodiment of the invention. In this embodiment, when left and right are referred to in relation to the projector 10, they denote, respectively, left and right with respect to a projecting direction, and when front and rear are referred to in relation to the projector 10, they denote, respectively, front and rear with respect to a direction towards a screen from the projector 10 and a traveling direction of a pencil of light emitted from the projector 10.

As shown in FIG. 1, the projector 10 has a substantially rectangular parallelepiped shape. The projector 10 has a projection opening which is covered with a lens cover 19 at a side of a front panel 12 that is a front side panel of a casing of the projector 10. A plurality of inside air outlet ports 17 are provided in the front panel 12. Further, although not shown, the projector 10 has an Ir reception unit which receives a control signal from a remote controller.

In addition, a keys/indicators unit 37 is provided on an upper panel 11 of the casing. Disposed on this keys/indicators unit 37 are keys and indicators which include a power indicator, a projection switch key, an overheat indicator, and the like. The power indicator informs whether a power switch key or a power supply is on or off. The projection switch key is configured to turn on or off a projection of the projector. The overheat indicator informs of an overheat condition occurring in a light source unit, a display device, a control unit or the like when they really overheat.

Further, an input/output connector unit where USB terminals, an image signal D-SUB terminal where analog RGB image signals are inputted, an S terminal, an RCA terminal, a voice output terminal and the like are provided and (a group of) various types of terminals 20 including a power supply adaptor plug are provided on a back panel 13 at the rear of the casing. Additionally, a plurality of outside air inlet ports are formed in the back panel 13. Additionally, pluralities of inside air outlet ports 17 are formed in a right side panel which is aside panel of the casing which is not shown, a left side panel 15 which is a side panel shown in FIG. 1 and the front panel 12. Outside air inlet ports 18 are also formed in a corner portion between the left side panel 15 and the back panel 13 and the back panel 13.

Figure 2:
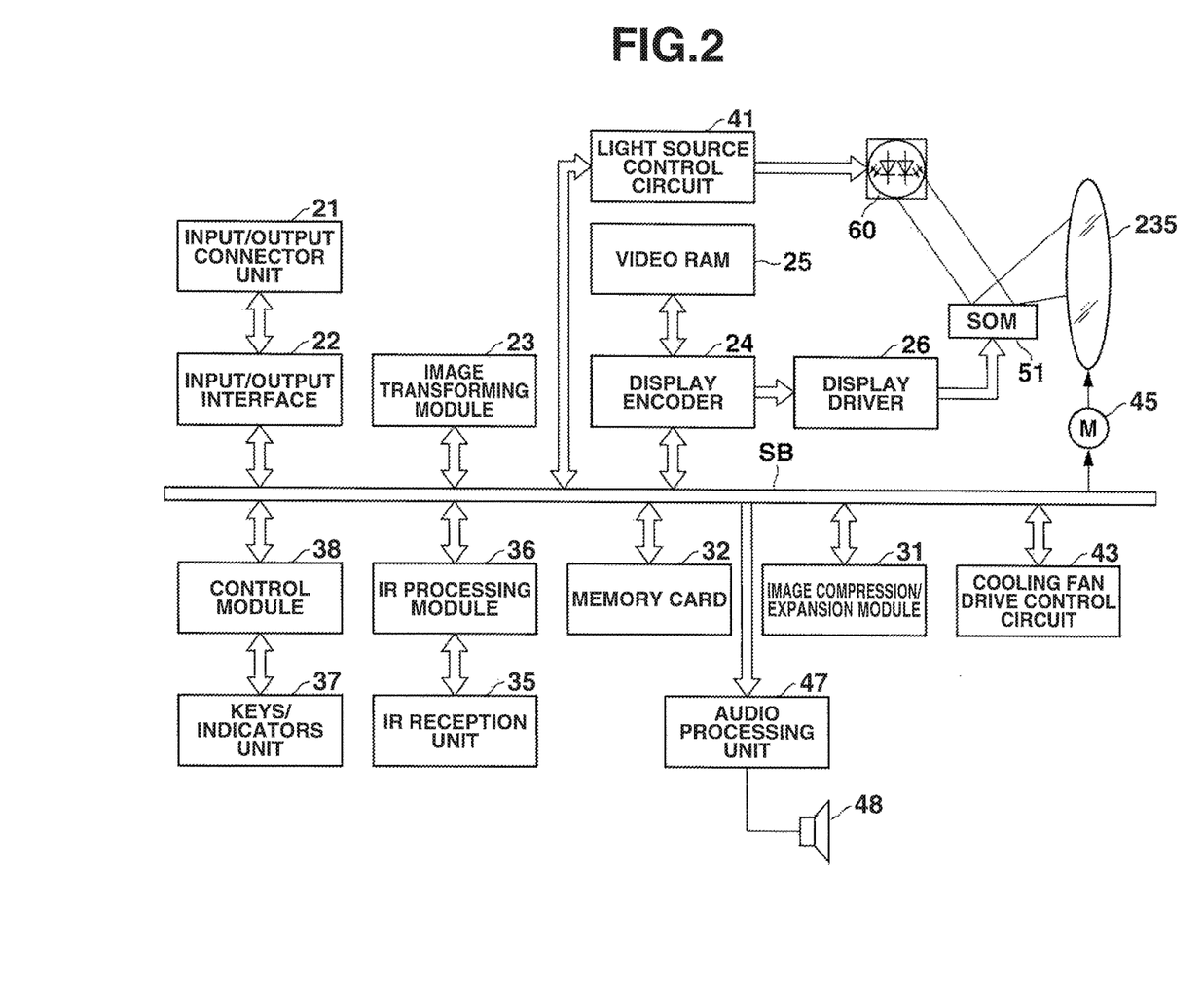
FIG. 2 is a functional block diagram of the projector according to the embodiment of the invention.

Next, a projector control unit of the projector 10 will be described by the use of a functional block diagram shown in FIG. 2. The projector control unit includes a control module 38, an input/output interface 22, an image transforming module 23, a display encoder 24, a display driver 26 and the like.

This control module 38 governs the control of operations of circuitries within the projector 10 and is made up of a CPU, a ROM which stores in a fixed fashion operation programs of various types of settings, a RAM which is used as a working memory, and the like.

Image signals of various standards which are inputted from an input/output connector unit 21 are sent via the input/output interface 22 and a system bus (SB) to the image transforming module 23 where the image signals are transformed so as to be unified into an image signal of a predetermined format which is suitable for display by the projector control unit. Thereafter, the image signals so transformed are outputted to the display encoder 24.

The display encoder 24 deploys the image signals that have been inputted thereinto on a video RAM 25 for storage therein and generates a video signal from the contents stored in the video RAM 25, outputting the video signal so generated to the display driver 26.

The display driver 26 functions as a display device control module and drives a display device 51, which is a spatial optical modulator (SOM), at an appropriate frame rate in response to the image signal outputted from the display encoder 24.

In this projector 10, a pencil of light that is emitted from a light source unit 60 is shone onto the display device 51 via a light source side optical system, whereby an optical image is formed by using reflected light reflected by the display device 51. The image so formed is then projected on to a screen, not shown, for display thereon via a projection side optical system. A movable lens group 235 of the projection side optical system is driven by a lens motor 45 for zooming or focusing.

An image compression/expansion module 31 performs a recording process of data compressing a brightness signal and a color difference signal of the image signal to be sequentially written in a memory card 32 that is a detachable recording medium through operations using ADCT and the Huffman method.

Further, when in a reproducing mode, the image compression/expansion module 31 reads out the image data recorded on the memory card 32 and expands individual image data which make up a series of dynamic images frame by frame. Then, the image compression/expansion module 31 outputs the image data to the display encoder 24 via the image transforming module 23 so as to enable the display of dynamic images and the like based on the image data stored on the memory card 32.

Operation signals generated at the keys/indicators unit 37 which includes the keys and the indicators that are provided on the upper panel 11 of the casing are sent out directly to the control module 38. Key operation signals from the remote controller are received by the Ir reception unit 35, and cord signals are demodulated by an Ir processing module 36 to be outputted to the control module 38.

An audio processing unit 47 is connected to the control module 38 via the system bus (SB). This audio processing module 47 includes a circuitry for a sound source such as a PCM sound source. When in a projection mode and a reproducing mode, the audio processing unit 47 converts audio data into analog signals and drives a speaker 48 to output loudly sound or voice based on the audio data.

The control module 38 controls a light source control circuit 41 which is configured as a light source control unit. This light source control circuit 41 controls separately and individually the emission of lights in the red, green and blue wavelength ranges from the light source unit 60 so that the lights in the predetermined wavelength ranges which are required when an image is generated are emitted from the light source unit 60.

Further, the control module 38 causes a cooling fan drive control circuit 43 to detect temperatures through a plurality of temperature sensors which are provided in the light source unit 60 and the like so as to control the rotating speeds of cooling fans based on the results of the temperature detections. The control module 38 also controls the cooling fan drive control circuit 43 so that the cooling fans continue to rotate even after the power supply to the projector 10 itself is turned off through a timer or the power supply to the projector 10 itself is turned off depending upon the results of the temperature detections by the temperature sensors.

Figure 3:
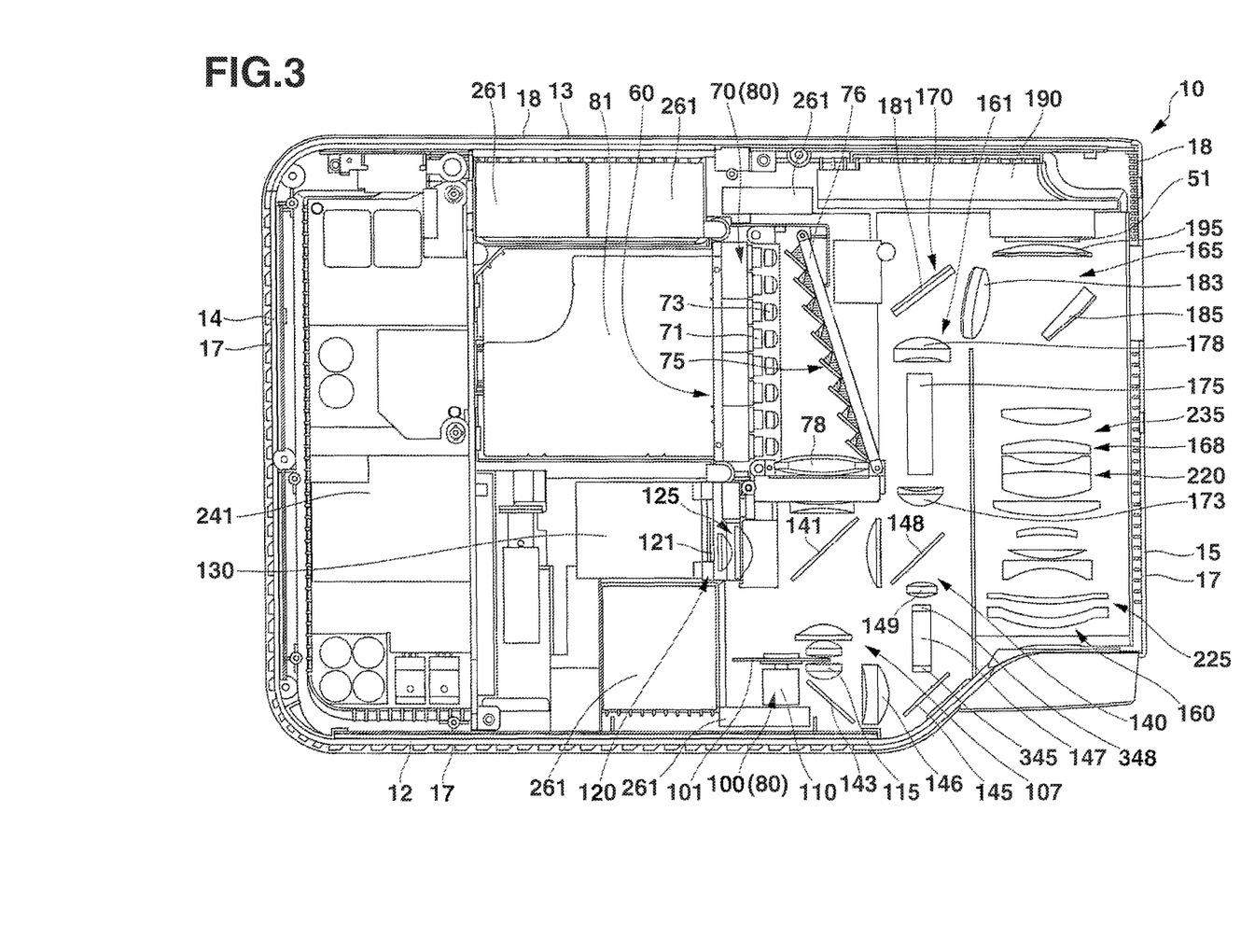
FIG. 3 is a schematic plan view showing an internal construction of the projector according to the embodiment of the invention.

Next, an internal construction of the projector 10 will be described based on what is shown in FIG. 3. FIG. 3 is a schematic plan view showing the internal construction of the projector 10. The projector 10 includes a control circuit board 241 near the right side panel 14. The control circuit board 241 includes a power supply circuit block, a light source control block and the like. The projector 10 includes the light source unit 60 to a side of the control circuit board 241, that is, in a substantially central portion of the projector casing. Further, the projector 10 includes an optical system unit 160, which is made up of an illumination side block 161, a projection side block 168 and the like, between the light source unit 60 and the left side panel 15.

The light source unit 60 includes a blue light source device 70, a luminescent wheel device 100, a red light source device 120, and a light guiding optical system 140. The blue light source device 70 is disposed substantially in a transversely central portion of the projector casing and near the back panel 13. The luminescent wheel device 100 is disposed on an axis of a pencil of light emitted from the blue light source device 70 and near the front panel 12. The red light source device 120 is disposed between the blue light source device 70 and the luminescent wheel device 100. The light guiding optical system 140 changes the directions of axes of light emitted from the luminescent wheel device 100 and light emitted from the red light source device 120 so that the lights travel along the same light axis and collects the green light and the red light to an incident port of a light tunnel 175 which constitutes a predetermined surface.

The blue light source device 70 includes a light source group, a reflecting mirror group 75, a collective lens 78, a heat sink 81 and the like. The light source group includes a plurality of blue laser diodes 71 which are disposed so that their optical axes are parallel to the back panel 13. The reflecting mirror group 75 changes the directions of axes of lights emitted from the blue laser diodes by 90 degrees towards the front panel 12. The collective lens 78 collects the lights emitted from the individual blue laser diodes 71 and reflected by the reflecting mirror group 75. The heat sink 81 is disposed between the blue laser diodes 71 and the right side panel 14.

The light source group includes the blue laser diodes 71 which are arranged into a matrix configuration. Additionally, collimator lenses 73 are disposed individually on optical axes of the blue laser diodes 71 so as to individually convert the lights emitted from the blue laser diodes 71 into parallel lights in order to enhance the directionality of them. The reflecting mirror group 75 is formed by arranging a plurality of reflecting mirrors like steps in a staircase while integrating them with a mirror substrate 76 and adjusting properly the positions of the reflecting mirrors on the mirror substrate 76, so that sectional areas of pencils of light emitted from the blue laser diodes 71 are narrowed in one direction for emission towards the collective lens 78.

A cooling fan 261 is disposed between the heat sink 81 and the back panel 13, and the blue laser diodes 71 are cooled by this cooling fan 261 and the heat sink 81. Further, a cooling fan 261 is also disposed between the reflecting mirror group 75 and the back panel 13, and the reflecting mirror group 75 and the collective lens 78 are cooled by this cooling fan 261.

The luminescent wheel device 100 includes a luminescent wheel 101, a wheel motor 110 which drives to rotate the luminescent wheel 101, a collective lens group 107 and a collective lens 115 which collects a pencil of light emitted from the luminescent wheel 101 in the direction of the front panel 12. The luminescent wheel 101 is disposed so as to be parallel to the front panel 12, that is, so as to be at right angles to an axis of light emitted from the blue light source device 70. The collective lens group 107 is configured not only to collect a pencil of light emitted from the blue light source device 70 to the luminescent wheel 101 but also to collect a pencil of light emitted from the luminescent wheel 101 in the direction of the back panel 13. A cooling fan 261 is disposed between the wheel motor 110 and the front panel 12, and the luminescent wheel device 100 and the like are cooled by this cooling fan 261.

Figure 4:
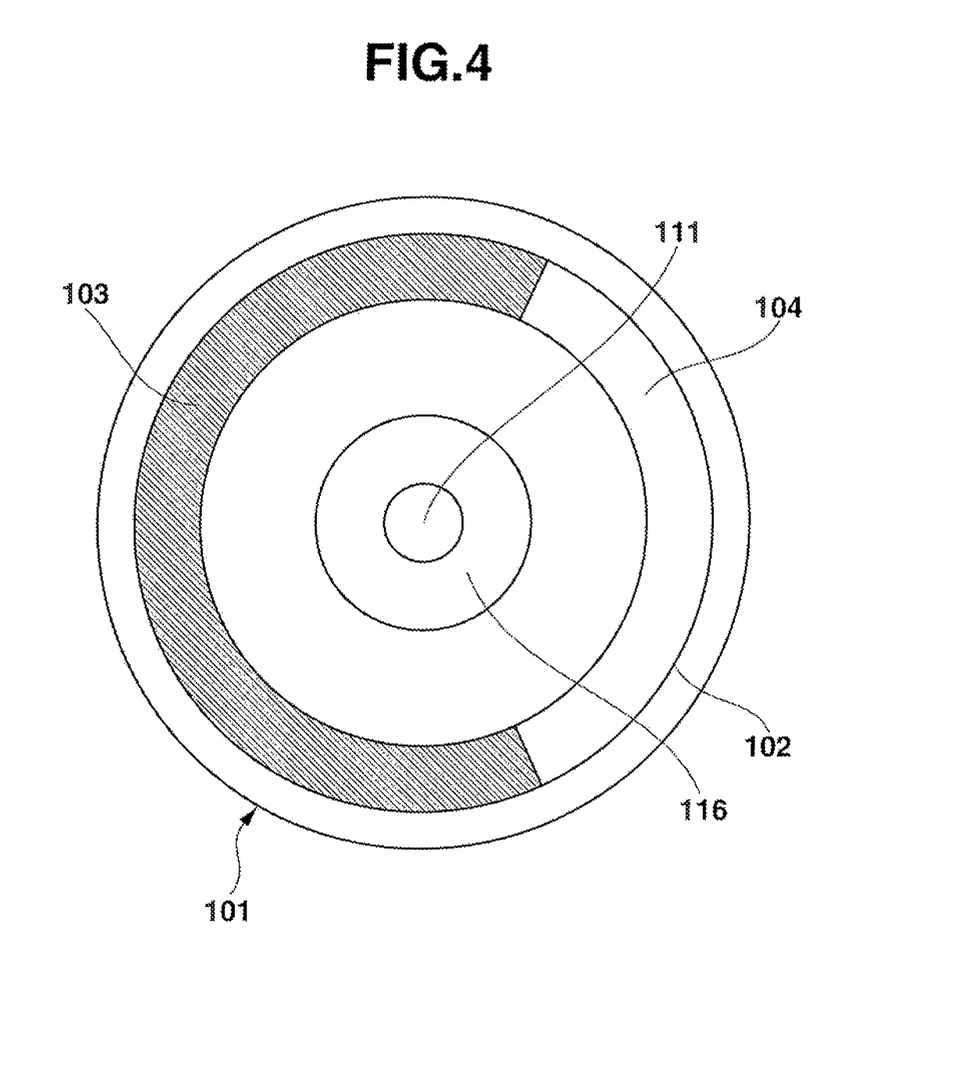
FIG. 4 is a front view of a luminescent wheel of the projector according to the embodiment of the invention.

As shown in FIG. 4, the luminescent wheel 101 includes a luminescent light emitting area 103 and a diffuse transmission area 104 which are provided end to end continuously in a circumferential direction. The luminescent light emitting area 103 receives light which is emitted from the blue light source device 70 and which then passes through the collective lens group 107 as excitation light to thereby emit luminescent light in the green wavelength range. The diffuse transmission area 104 transmits light emitted from the blue light source device 70 while diffusing the same light.

A base material 102 of the luminescent wheel 101 is a metallic base material which is made of copper, aluminum or the like. An annular groove is formed on a surface of the base material 102 which faces the blue light source device 70. A bottom portion of this groove is mirror finished through silver deposition or the like, and a layer of a green luminescent material is laid out on the mirror finished surface. Further, the diffuse transmission area 104 is formed by fitting a transparent material having a light transmission characteristic in a through hole portion which is cut out in the base material 102 and forming minute irregularities on the surface of the transparent base material through sandblasting or the like. The luminescent wheel 101 is fitted on a hub 116 which is fixedly provided on a rotational shaft 111 of the wheel motor 110 so as to be fixed to the hub 116.

In FIG. 3, a green light source device 80 includes the luminescent wheel device 100 and the blue light source device 70 which functions as an excitation light source. The green light source device 80 is such that light in the blue wavelength range which is emitted from the blue light source device 70 is shone on to the green luminescent material layer of the luminescent wheel 101, whereupon the green luminescent material in the green luminescent material layer is excited to emit light in the green wavelength range in every direction from the green luminescent material. Pencils of green luminescent light are then emitted towards the back panel 13 to be incident on the collective lens group 107. On the other hand, light in the blue wavelength range emitted from the blue light source device 70 which is incident on the area of the luminescent wheel 101 which transmits incident light while diffusing the same light passes through the luminescent wheel 101 to be incident on the collective lens 115.

The red light source device 120 is a monochromatic light emitting device and includes a red light source 121 which is disposed so that an optical axis thereof is parallel to the blue laser diodes 71 and a collective lens group 125 which collects light emitted from the red light source 121. This red light source 121 is a red light emitting diode which emits light in the red wavelength range. This red light source device 120 is disposed so that an axis of light in the red wavelength range which is emitted from the red light source device 120 intersects with the axes of the light in the blue wavelength range which is emitted from the blue light source device 70 and the light in the green wavelength range which is emitted from the luminescent wheel 101. Further, the red light source device 120 includes a heat sink 130 which is disposed on a side of the red light source 121 which faces the right side panel 14. Additionally, a cooling fan 261 is disposed between the heat sink 130 and the front panel 12. The red light source 121 is cooled by this cooling fan 261 and the heat sink 130.

The light guiding optical system 140 includes collective lenses which collect pencils of light in the red, green and blue wavelength ranges and reflecting mirrors and dichroic mirrors which change the directions of axes of the pencils of light in the red, green and blue wavelength ranges so that the pencils of light travel along the same axis. Specifically, a first dichroic mirror 141 is disposed in a position where the light in the blue wavelength range emitted from the blue light source device 70 and the light in the green wavelength range emitted from the luminescent wheel 101 intersect with the light in the red wavelength range emitted from the red light source device 120. The first dichroic mirror 141 is configured to transmit the lights in the blue and red wavelength ranges while reflecting the light in the green wavelength range so as to change the direction of the axis of the light in the green wavelength range by 90 degrees in the direction of the left side panel 15.

Additionally, a first reflecting mirror 143 is disposed on the axis of the light in the blue wavelength range which passes through the luminescent wheel 101 while being diffused, that is, between the collective lens 115 and the front panel 12. This first reflecting mirror 143 reflects the light in the blue wavelength range so as to change the direction of the axis of the blue light by 90 degrees in the direction of the left side panel 15. A collective lens 146 is disposed on a side of the first reflecting mirror 143 which faces the left side panel 15. Further, a second dichroic mirror 145 is also disposed on the side of the first reflecting mirror 143 which faces the left side panel 15. A first optical filter 348 and a second optical filter 345 are disposed on aside of the second dichroic mirror 145 which faces the back panel 13, and a wavelength conversion member 147 is disposed between the first optical filter 348 and the second optical filter 345. The wavelength conversion member 147 is made up of a member which is formed to include a luminescent material mixed therein which emits light in the green wavelength range (light in a second wavelength range) having a wavelength peak on a longer wavelength side than a wavelength peak of the light in the blue wavelength range (light in a first wavelength range).

The second dichroic mirror 145 changes the direction of an axis of the light in the blue wavelength range which is reflected by the first reflecting mirror 143 and which is then incident thereon via the collective lens 146 by 90 degrees towards the back panel 13. Additionally, the second dichroic mirror 145 transmits return light in a specific wavelength range which is emitted from the second optical filter 345 of the wavelength conversion member 147. The light in the blue wavelength range which is reflected by the second dichroic mirror 145 is incident on the wavelength conversion member 147 which is configured to adjust the color tone of the light in the blue wavelength range. The wavelength conversion member 147, the second dichroic mirror 145 and a third dichroic mirror 148 will be described in detail later.

The third dichroic mirror 148 is disposed in a position where the axis of the light in the red wavelength range which passes through the first dichroic mirror 141 and the axis of the light in the green wavelength range which is reflected by the first dichroic mirror 141 so as to coincide with the axis of the red light intersect with the axis of the light in the blue wavelength range with its color tone having been adjusted which emerges from the first optical filter 348 of the wavelength conversion member 147 and which then passes through a collective lens 149. The third dichroic mirror 148 transmits a pencil of light which emerges from the first optical filter 348. On the other hand, pencils of light from the red light source device 120 and the green light source device 80 are reflected by the third dichroic mirror 148 so that the directions of the axes of the pencils of red and green lights are changed by 90 degrees in the direction of the back panel 13.

A collective lens 173 is disposed near the light tunnel 175, and this collective lens 173 collects the light source light to the incident port of the light tunnel 175. Consequently, the light in the red wavelength range and the light in the green wavelength range which are reflected by the third dichroic mirror 148 and the light in the blue wavelength range whose color tone is adjusted and which passes through the third dichroic mirror are collected by the collective lens 173 to be incident on the light tunnel 175.

The optical system unit 160 is formed substantially into a U-shape by three blocks which are the illumination side block 161, an image generating block 165 and the projection side block 168. The illumination side block 161 is positioned to the left of the blue light source device 70. The image generating block 165 is positioned near a position where the back panel 13 intersects with the left side panel 15. The projection side block 168 is positioned between the light guiding optical system 140 and the left side panel 15.

The illumination side block 161 includes part of a light source side optical system 170 which guides the light source light emitted from the light source unit 60 into the display device 51 which is included in the image forming block 165. As the part of the light source side optical system 170 which the illumination side block 161 includes, there are the light tunnel 175 which converts the pencil of light emitted from the light source unit 60 into a pencil of light having a uniform illuminance distribution, the collective lens 178 which collects the light emitted from the light tunnel 175, a light axis changing mirror 181 which changes the direction of the axis of the pencil of light emitted from the light tunnel 175 toward the image forming block 165, and the like.

The image generating block 165 has, as the light source side optical system 170, a collective lens 183 and a shining mirror 185. The collective lens 183 collects the light source light reflected at the light axis changing mirror 181 to the display device 51. The shining mirror 185 shines the pencil of light which passes through the collective lens 183 on to the display device 51 at a predetermined angle. Further, the image generating block 165 includes DMDs which make up the display device 51. A heat sink 190 configured to cool the display device 51 is disposed between the display device 51 and the back panel 13, whereby the display device 51 is cooled by this heat sink 190. Additionally, a condenser lens 195 making up part of a projection side optical system 220 is disposed near a front side of the display device 51.

The projection side block 168 has a lens group of the projection side optical system 220 which emits "on" light which is reflected at the display device 51 on to a screen. As the projection side optical system 220, the projection side block 168 includes a fixed lens group 225 which is incorporated in a fixed lens barrel and the movable lens group 235 which is incorporated in a movable lens barrel and is made into a variable-focus lens with a zooming function. In this variable-focus lens, the movable lens group 235 is moved by the lens motor for zooming and focusing.

By configuring the projector 10 in this way, when the luminescent wheel 101 is rotated and lights are emitted from the blue light source device 70 and the red light source device 120 at different timings, lights in the red and green wavelength ranges and light in the blue wavelength range whose color tone is adjusted are sequentially incident on the light tunnel 175 via the light guiding optical system 140 and then are incident on the display device 51 via the light source side optical system 170. Then, the DMDs in the display device 51 of the projector 10 time-share the red, green and blue lights for display according to the data, thereby making it possible to generate color images on a screen.

Figure 5A:
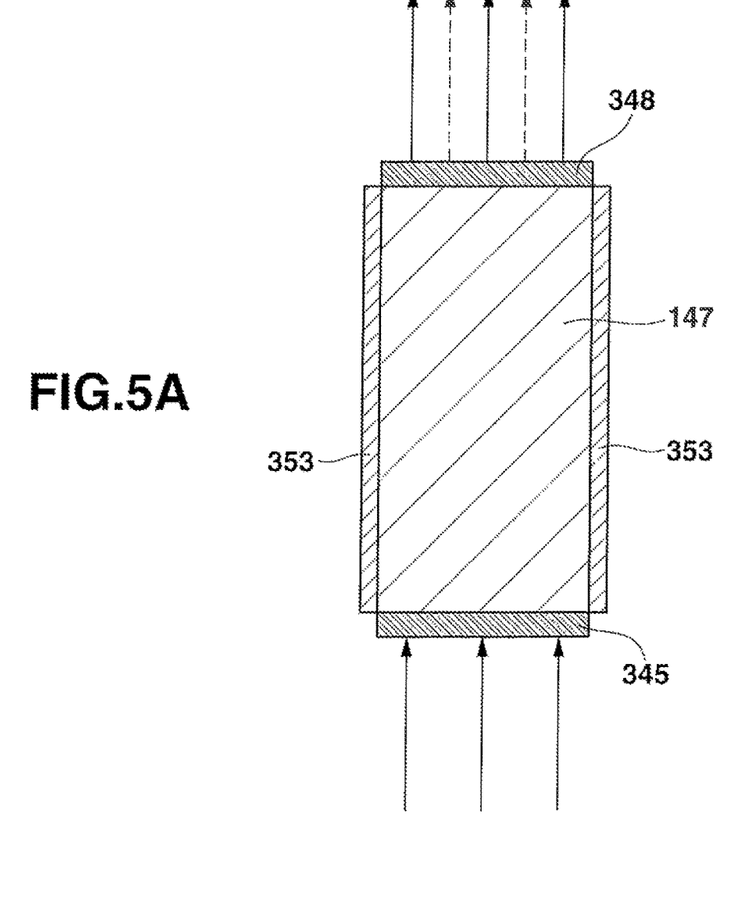
Figure 5B:
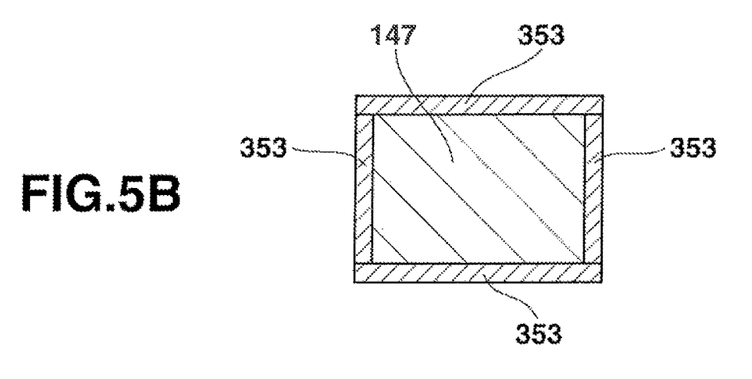
Figure 6:
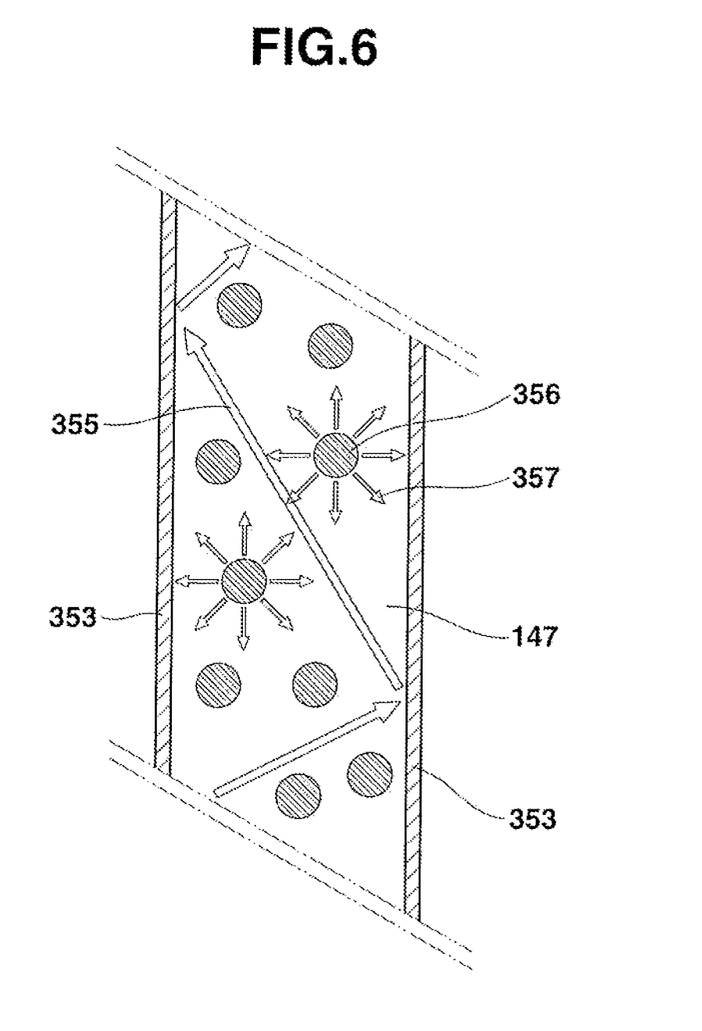
FIG. 6 is a schematic vertical sectional view showing how light works and travels in the wavelength conversion member of the projector according to the embodiment of the invention after the light enters the wavelength conversion member.

Here, referring to FIGS. 5A, 5B and 6, the wavelength conversion member 147 will be described. FIG. 5A is a vertical sectional view of the wavelength conversion member 147. FIG. 5B is a cross-sectional view of the wavelength conversion member 147. FIG. 6 is a schematic vertical sectional view showing how light in the blue wavelength range travels through the wavelength conversion member 147.

The wavelength conversion member 147 shown in FIGS. 5A, 5B adjusts the color tone of light in the blue wavelength range which is incident thereon. Specifically, the wavelength conversion member 147 is formed into a glass rod made of a composite material of glass and a luminescent material by mixing and dispersing the luminescent material in the form of powder in powered glass, the luminescent material being able to emit luminescent light which belongs to the green wavelength range which is longer in wavelength than light in the blue wavelength range emitted from the blue laser diodes 71. Thus, in the wavelength conversion member 147, the luminescent material is contained and dispersed in the optical glass. As shown in FIG. 5A, the wavelength conversion member 147 is formed into a rectangular parallelepiped shape which extends in a longitudinal direction in external appearance. Additionally, as shown in FIG. 5B, the wavelength conversion member 147 is formed into a rectangular in cross section. The luminescent material mixed in the wavelength conversion member 147 is excited by light in the blue wavelength range which is incident thereon, whereby luminescent light is emitted.

Four sides of the wavelength conversion member 147 are mirror finished so as to form opposite reflecting surfaces which constitute mirror portions 353. The mirror portions 353 are formed as coated layers through spraying. The second optical filter 345 is provided at an incident side end face of the wavelength conversion member 147, and this second optical filter 345 is a dichroic filter which transmits light of a predetermined wavelength and reflects lights of other wavelengths than the predetermined wavelength. The first optical filter 348, which is similar to the second optical filter 345, is provided at an emerging side end face of the wavelength conversion member 147. Both the optical filters transmit light in the blue wavelength range and a luminescent light component in a predetermined wavelength range of the luminescent light emitted from the luminescent material which is mixed into the wavelength conversion member 147.

Next, referring to FIG. 6, an internal state of the wavelength conversion member 147 will be described, when the light in the blue wavelength range from the blue laser diodes 71 is incident on the wavelength conversion member 147. Here, the light in the blue wavelength range which is incident on the wavelength conversion member 147 is indicated by an arrow 355. The luminescent material which is mixed into the wavelength conversion member 147 which is the glass rod is denoted by 356. Luminescent light emitted by the luminescent material 356 is indicated by an arrow 357.

The light 355 in the blue wavelength range which is incident on the wavelength conversion member 147 is reflected within the wavelength conversion member 147 by the mirror portions 353 which are provided on the four side surfaces thereof and travels from the incident side end face towards the emerging side end face. Then, the luminescent material 356 is excited by part of the light 355 in the blue wavelength range, whereby luminescent light 357 is emitted. This luminescent light is emitted in every direction radially outwards of the luminescent material 356, of which some travel towards the emerging side end face and the incident side end face and others are reflected by the mirror portions 353 on the side surfaces of the wavelength conversion member 147 to be directed towards the incident side and emerging side end faces.

In this embodiment, the light in the blue wavelength range is emitted from the blue laser diodes 71 as its light source. The light emitted from the blue laser diodes 71 has a peak wavelength of about 450 nm. In a projected image formed by projection light emitted from the display device 51 by virtue of adopting the blue laser diodes 71, which emits the light in the blue wavelength range having such a peak wavelength, as a light source of the display device 51, blue tends to have a color tone of slightly purplish blue. Then, the light in the blue wavelength range and the light in the predetermined wavelength range within the green wavelength range are emitted by the wavelength conversion member 147 so that the light in the blue wavelength range emitted from the blue laser diodes 71 is shifted to a longer wavelength side to adjust the color tone of the blue light visually.

Figure 7:
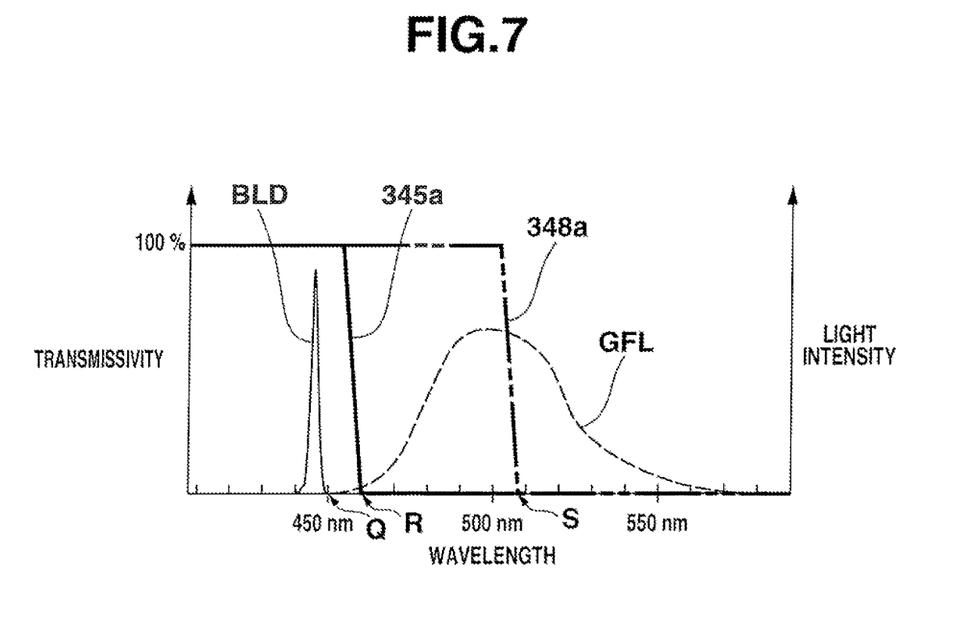

Here, referring to FIG. 7 which shows a relationship between wavelength and transmissivity or light intensity, the adjustment of the color tone of the light in the blue wavelength range (the first wavelength range) from the blue laser diodes 71 will be described. Here, a transmission spectrum 345a of the second optical filter 345 is shown by a solid line. A transmission spectrum 348a of the second optical filter 348 is shown by a chain double-dashed line. A curve showing the light intensity of the light in the blue wavelength range emitted from the blue laser diodes 71 is shown by a solid line BLD. The light intensity of the light in the green wavelength range (the second wavelength range) which is the luminescent light emitted from the luminescent material mixed into the wavelength conversion member 147 is shown by a broken line GFL.

The wavelength range of the light in the blue wavelength range emitted from the blue laser diodes 71 which is shown by the solid line BLD falls within the range of the wavelength range of the transmission spectrum 345a of the second optical filter 345, and therefore, all the light from the blue laser diodes 71 is incident on the wavelength conversion member 147. When the light in the blue wavelength range from the blue laser diodes 71 is incident on the wavelength conversion member 147, the luminescent material mixed in the wavelength conversion member 147 is excited, whereby the luminescent light shown by the broken line GFL is emitted.

Here, the wavelength range of the light in the green wavelength range which is necessary to adjust the color tone of the light in the blue wavelength range emitted from the blue laser diodes 71 and whose light intensity is shown by the broken line GFL falls in a range from a wavelength R (a fourth wavelength) to a wavelength S (a third wavelength). The wavelength R (the fourth wavelength) is situated between a peak of the light in the blue wavelength range (the light in the first wavelength range) and a peak of the light in the green wavelength range (the light in the second wavelength range). Additionally, the wavelength S (the third wavelength) is situated in within the wavelength range of the light in the green wavelength range (the light in the second wavelength range) and is situated on a longer wavelength side than the wavelength R (the fourth wavelength). Consequently, in the broken line GFL which is the luminescent light of the wavelength conversion member 147, a wavelength range from a wavelength Q, which is a minimum value of the wavelength range of the luminescent light, to the wavelength range R and a wavelength range longer than the wavelength S are wavelength ranges which are unnecessary for color tone adjustment. Here, in the broken line GFL, the light in the wavelength range from the wavelength Q to the wavelength R is referred to as the "luminescent light on the lower wavelength side which is unnecessary for color tone adjustment." In the broken line GFL, the light in the longer wavelength than the wavelength S is referred to as the "luminescent light on the longer wavelength side which is unnecessary for color tone adjustment."

As shown by the transmission spectrum 348a of the first optical filter 348, the first optical filter 348 does not transmit light in wavelength ranges which are longer than the wavelength S but transmits light in wavelength ranges which are equal to or shorter than the wavelength S. Consequently, the first optical filter 348 transmits the luminescent light (the light in the second wavelength range) emitted from the luminescent material in the wavelength conversion member 147 from which the luminescent light on the longer wavelength side which is unnecessary for color tone adjustment (in other words, the luminescent light whose wavelength is equal to or shorter than the wavelength S) is excluded as well as the light in the blue wavelength range (the light in the first wavelength range) emitted from the blue laser diodes 71.

Then, a pencil of light emitted from the first optical filter 348 passes through the third dichroic mirror 148. Although the luminescent light which passes through the third dichroic mirror 348 belongs to the light in the green wavelength range, its wavelength differs from the wavelength of the light in the green wavelength range emitted from the wheel device 100. Consequently, although the light in the green wavelength range which is the luminescent light emitted from the first optical filter 348 passes through the third dichroic mirror 148, the light in the green wavelength range which is emitted from the luminescent wheel device 100 is reflected by the third dichroic mirror 148.

On the other hand, the wavelength conversion member 147 is formed as the glass rod. Thus, light is reflected on the side surfaces in the interior of the wavelength conversion member 147. Additionally, the first optical filter 348 transmits the luminescent light in the range from the wavelength Q to the wavelength R which is unnecessary for color tone adjustment (that is, the luminescent light on the lower wavelength side which is unnecessary for color tone adjustment) together with the light in the blue wavelength range. Consequently, the quantity of the luminescent light on the lower wavelength side which is unnecessary for color tone adjustment needs to be reduced to as low a level as possible. Therefore, the second optical filter 345 is made to transmit the luminescent light on the lower wavelength side, which is unnecessary for color tone adjustment, as return light so as to be emitted from the interior of the wavelength conversion member 147 to the exterior thereof.

The luminescent light on the lower wavelength side which is unnecessary for color tone adjustment is so emitted from the second optical filter 345 and is then allowed to pass through the second dichroic mirror 145 shown in FIG. 3 to be absorbed by an inner surface of the front panel 12. Thus, the luminescent light unnecessary for color tone adjustment is prevented from constituting stray light in the interior of the projector 10. In this way, the second optical filter 345 transmits the light whose wavelength is shorter than the first optical filter 348.

Figure 8A:
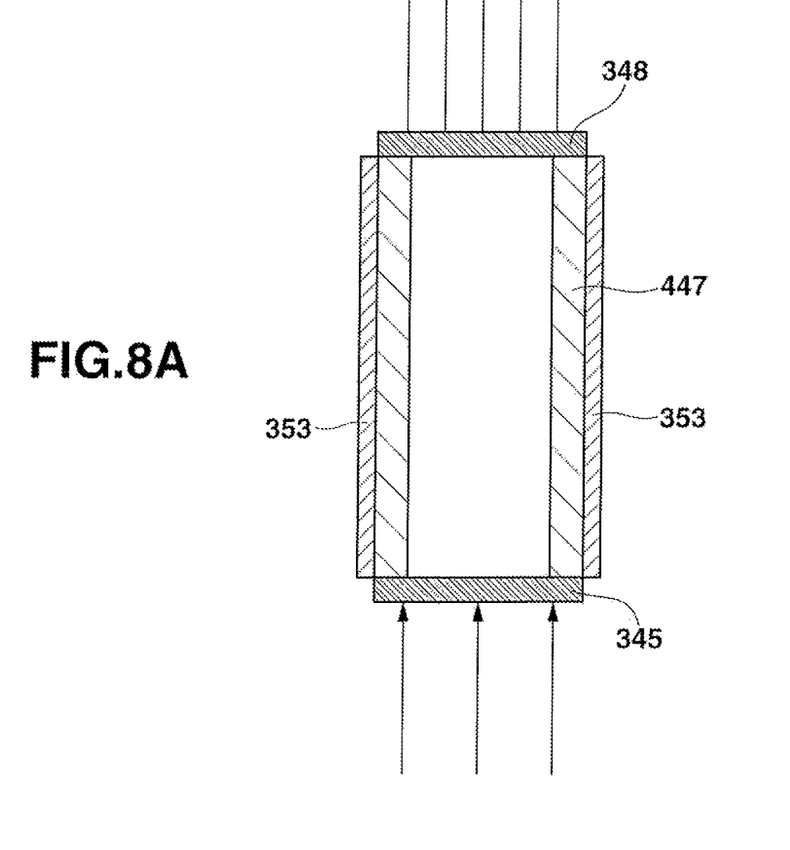
Figure 8B:
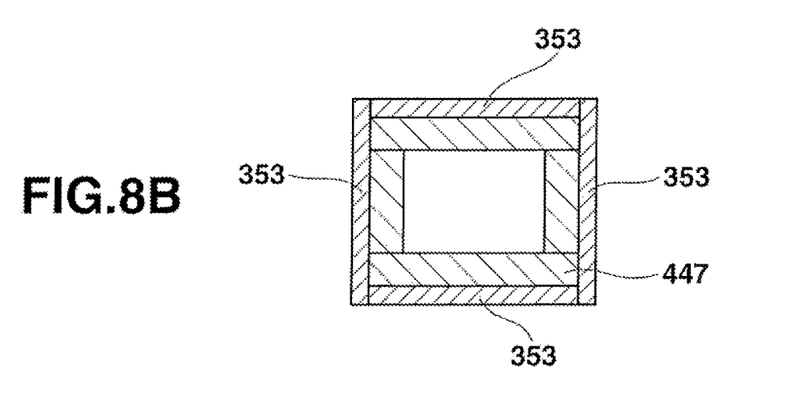

Next, referring to FIGS. 8A, 8B, another embodiment will be described. In this embodiment, in place of the wavelength conversion member 147 in the previous embodiment, a wavelength conversion member 447 is formed in a light tunnel. Here, FIG. 8A is a vertical sectional view of the wavelength conversion member 447, and FIG. 8B is a cross-sectional view of the wavelength conversion member 447.

The wavelength conversion member 447 is formed of a similar composite material to the composite material of which the wavelength conversion member 147 in the previous embodiment is formed. Namely, a powdered luminescent material is mixed and dispersed in powdered glass, the powdered luminescent material being able to emit luminescent light in the green wavelength range whose wavelength is longer than that of light in the blue wavelength range which is emitted from blue laser diodes 71. Then, the luminescent material containing glass is formed into flat mirror plates. The glass mirror plates are combined together so as to be formed into a rectangular parallelepiped shape which extends in a longitudinal direction in external appearance. Thus, the wavelength conversion member 447 is formed into alight tunnel of a quadrangular tube.

A mirror portion 353 is provided on each of four side surfaces of the wavelength conversion member 447. As with those of the previous embodiment, the mirror portions 353 of this embodiment are also formed as a mirror coated layer through spraying. As to a second optical filter 345 and a first optical filter 348, as with those of the previous embodiment, the second filter 345 is provided at an incident side of the wavelength conversion member 447, and the first optical filter 348 is provided at an emerging side of the wavelength conversion member 447.

In the wavelength conversion member 447 configured in the way described, too, as with that of the previous embodiment, the color tone of light in the blue wavelength range which is emitted from the blue laser diodes 71 is adjusted. Namely, in this embodiment, the light in the blue wavelength range emitted from the blue laser diodes 71 is incident on the wavelength conversion member 447 which is formed as the light tunnel. Then, in the wavelength conversion member 447, luminescent light is emitted from the luminescent material which is mixed into the wavelength conversion member 447 as a result of the luminescent material being excited by the light in the blue wavelength range which is so incident.

Then, the wavelength conversion member 447 emits luminescent light emitted from the luminescent material mixed in the wavelength conversion member 447 from which luminescent light on a longer wavelength side which is unnecessary for color tone adjustment is excluded as well as the light in the blue wavelength range (the light in the first wavelength range) emitted from the blue laser diodes 71 via the first optical filter 348. The second optical filter 345 emits the luminescent light emitted from the luminescent material mixed in the wavelength conversion member 447 excluding luminescent light on a lower wavelength side which is unnecessary for color tone adjustment as return light. As a result of this, the color tone of the light in the blue wavelength range emitted from the blue laser diodes 71 is adjusted.

Thus, while the embodiments of the invention have been described heretofore, the invention is not limited thereto and hence can be carried out while being altered as required. For example, in the embodiments, while the wavelength conversion member is formed as the glass rod or the light tunnel which is formed of the glass powder into which the luminescent material is mixed, a wavelength conversion member can also be formed by mixing a luminescent material having the same wavelength range into a transparent resin material or a resin material having transmissivity. Additionally, in the embodiments, while the first optical filter and the second optical filter are formed into the dichroic filters, the invention can be carried out by adopting an optical filter of an absorbing type or optical filters of other types.

Further, in the embodiments, while the luminescent material mixed in the wavelength conversion member is the luminescent material which emits the light in the green wavelength range, the invention is not limited thereto, and hence, a luminescent material emitting luminescent light in an appropriate wavelength range can be selected according to a form of color tone adjustment of the light in the blue wavelength range emitted from the blue laser diodes 71.

Thus, as has been described heretofore, in the light source unit 60 of the embodiment, the blue laser diodes 71 are provided to make up the blue light source device 70 which constitutes the excitation light source. The light emitted from the blue laser diodes 71 is incident on the wavelength conversion member 147. The wavelength conversion member 147 is formed to include the luminescent material mixed thereinto which emits the light in the green wavelength range (the light in the second wavelength range) which is the luminescent light in the wavelength range which adjusts the color tone of the light in the blue wavelength range (the light in the first wavelength range) emitted from the blue laser diodes 71. Additionally, the first optical filter 348 is provided on the emerging side of the wavelength conversion member 147. The first optical filter 348 emits the luminescent light emitted from the luminescent material mixed in the wave conversion member 147 from which the luminescent light which is unnecessary for color tone adjustment (the luminescent light whose wavelength range is on the longer wavelength range than the third wavelength) is excluded and the light in the blue wavelength range.

In this way, the luminescent light which adjusts the color tone of the light in the blue wavelength range is emitted by the wavelength conversion member 147. Then, the first optical filter 348 emits the luminescent light from which the luminescent light which is unnecessary for color tone adjustment (the luminescent light whose wavelength range is on the longer wavelength range than the third wavelength) is excluded and the light in the blue wavelength range (the light in the first wavelength range). In this way, also in the event that the blue laser diodes 71 are adopted, the color tone of the light in the blue wavelength range emitted from the blue laser diodes 71 can be adjusted as required. Consequently, the light in the blue wavelength range emitted from the blue laser diodes 71 which is light in a wavelength range slightly close to the purple wavelength range can be adjusted to light in a wavelength range close to the blue of the sRGB, thereby making it possible to enhance the color reproduction characteristic of a projected image.

Because of this, the luminescent light is added to the light in the blue wavelength range emitted from the blue laser diodes 71 to form a blue image, while a red image is formed by the pencil of light from the red light source device 120 and a green image is formed by the pencil of light from the green light source device 80 so as to form a projected image. Thus, the projector using this light source unit 60 can project a high-quality image which is bright and high in color reproduction performance by the use of an image of primary colors which are close to the three primary colors of the sRGB.

The wavelength conversion member 147 has the second optical filter 345 which is provided at the incident side thereof. Then, the second optical filter 345 transmits, within the luminescent light emitted from the luminescent material in the wavelength conversion member 147, the luminescent light on the shorter wavelength side than that which pass through the first optical filter 348 (that is, the light in the wavelength range shorter than the fourth wavelength), whereby the return light of the luminescent light is emitted to the exterior of the wavelength conversion member 147. This can reduce, of the luminescent light emitted from the luminescent material, the emission of the luminescent light on the shorter wavelength side which is unnecessary for color tone adjustment (that is, the luminescent light in the wavelength range shorter than the fourth wavelength) from the first optical filter 348. Thus, the color tone of the light in the blue wavelength range can be executed in a more ensured fashion.

The wavelength conversion member 147 is formed of the optic glass in which the luminescent material is mixed and dispersed which emits the luminescent light in the wavelength range which can adjust the color tone of the light in the blue wavelength range. This enables the wavelength conversion member 147 to be fabricated in a similar fabrication method to a fabrication method for fabricating an optical device of glass.

The luminescent material which emits the luminescent light in the green wavelength range is mixed into the wavelength conversion member 147. This can shift the light in the blue wavelength range from the blue laser diodes 71 whose peak wavelength is about 450 nm to the longer wavelength side so that the light in the blue wavelength approaches the blue specified under the sRGB to thereby obtain the projected light generating the natural blue image.

The wavelength conversion member 147 has the rectangular parallelepiped shape which extends in the longitudinal direction as the external appearance. The mirror portions 353 are provided on the four side surfaces of the wavelength conversion member 147 by finishing the four side surfaces into the opposite reflecting surfaces. This can prevent the leakage of the light incident on the wavelength conversion member 147 from the side surfaces thereof. Further, the light which enters the wavelength conversion member 147 is reflected by the mirror portions 353 to excite the luminescent material mixed in the wavelength conversion member 147. Therefore, the luminescent light emitted in every direction can be reflected with good efficiency, thereby making it possible to enhance the utilization rate of the luminescent light generated. This enables to enhance brightness of the luminescent light emitted from the luminescent material for the color tone adjustment and then enables the color tone adjustment of the light in the blue wavelength range to be executed in a more ensured fashion.

Additionally, the wavelength conversion member 147 is formed as the glass rod. This enables the light in the blue wavelength range which is incident on the wavelength conversion member 147 to be diffused to obtain a pencil of light which is uniform in intensity distribution. Thus, in a case where the diffusion of the light in the blue wavelength range is not sufficient in the light tunnel 175 of the light source side optical system 170, this configuration can assist in diffusing the light in the blue wavelength range, whereby a uniformly diffused light can be obtained in a more ensured fashion.

The wavelength conversion member 447 is formed as the light tunnel. This allows the light tunnel which is relatively easy to handle to be used as the wavelength conversion member while obtaining a pencil of light which is uniform in illuminance distribution by diffusing the light in the blue wavelength range incident thereon. Thus, the illuminance distribution is made uniform to improve the unevenness in color while reducing the fabrication costs.

The light source unit 60 includes the blue light source device 70 which emits the light in the blue wavelength range, the red light source device 120 which emits the light in the red wavelength range, and the green light source device 80 which emits the light in the green wavelength range. In the light source unit which can emit the lights in the red, green and blue wavelength ranges, the color tone of the blue can be adjusted, thereby making it possible to obtain the projected light with the natural color tone.

The projector 10 includes the light source unit 60 including the wavelength conversion member 147, the display device 51 which forms the image light, the light source side optical system 170 which guides the light source light to the display device 51, the projection side optical system. 220 which projects the image light formed by the display device 51 on to a screen, and the control unit which controls the display device 51 and the light source unit 60. This can obtain the projector which can project the natural color tone on to the screen by adjusting the color tone of the blue.

The embodiments that have been described heretofore are presented as the examples and are not intended to limit the scope of the invention. These novel embodiments can be carried out in other various forms, and various omissions, replacements and/or modifications can be made thereto without departing from the spirit and scope of the invention. The resulting embodiments or their modifications are contained in the spirit and scope of the invention and are also contained in the scope of inventions claimed under claims and their equivalents.

What is claimed is:

1. A light source unit comprising:
   an excitation light source configured to emit light in a first wavelength range;
   a wavelength conversion member on which the light in the first wavelength range is incident from an incident side thereof and which comprises a member formed to include a luminescent material mixed therein which emits light in a second wavelength range having its wavelength peak on a longer wavelength side than a wavelength peak of the light in the first wavelength range;
   a first optical filter which is provided at an output side of the wavelength conversion member which lies opposite to the incident side, wherein the first optical filter transmits a light component of the light in the second wavelength range which has a wavelength shorter than a third wavelength lying in the second wavelength range; and
   a second optical filter which is provided at an end face of the wavelength conversion member on the incident side, wherein the second optical filter transmits light having a wavelength shorter than a fourth wavelength which is shorter than the third wavelength.

2. The light source unit according to claim 1, wherein the excitation light source includes a blue laser diode,
   wherein the light in the first wavelength range includes light in the blue wavelength range, and
   wherein the light in the second wavelength range includes luminescent light from the luminescent material.

3. The light source unit according to claim 2, wherein the wavelength conversion member is formed of optic glass into which the luminescent material is mixed and dispersed, the luminescent material emitting light in a wavelength range which adjusts the color tone of the light in the first wavelength range.

4. The light source unit according to claim 3, wherein the wavelength conversion member is formed as a rectangular parallelepiped shape which extends in a longitudinal direction in external appearance and has opposite reflecting surfaces on four side surfaces thereof.

5. The light source unit according to claim 2, wherein the luminescent material which is mixed into the wavelength conversion member emits luminescent light in the green wavelength range.

6. The light source unit according to claim 2, wherein the wavelength conversion member is formed as a rectangular parallelepiped shape which extends in a longitudinal direction in external appearance and has opposite reflecting surfaces on four side surfaces thereof.

7. The light source unit according to claim 2, wherein the wavelength conversion member is formed as a glass rod.

8. The light source unit according to claim 2, wherein the wavelength conversion member is formed as a light tunnel.

9. The light source unit according to claim 2, comprising further:
a red light source device and a green light source device.

10. The light source unit according to claim 1, wherein the wavelength conversion member is formed of optic glass into which the luminescent material is mixed and dispersed, the luminescent material emitting light in a wavelength range which adjusts the color tone of the light in the first wavelength range.

11. The light source unit according to claim 10, wherein the luminescent material which is mixed into the wavelength conversion member emits luminescent light in the green wavelength range.

12. The light source unit according to claim 10, wherein the wavelength conversion member is formed as a rectangular parallelepiped shape which extends in a longitudinal direction in external appearance and has opposite reflecting surfaces on four side surfaces thereof.

13. The light source unit according to claim 1, wherein the luminescent material which is mixed into the wavelength conversion member emits luminescent light in the green wavelength range.

14. The light source unit according to claim 1, wherein the wavelength conversion member is formed as a rectangular parallelepiped shape which extends in a longitudinal direction in external appearance and has opposite reflecting surfaces on four side surfaces thereof.

15. The light source unit according to claim 1, wherein the wavelength conversion member is formed as a glass rod.

16. The light source unit according to claim 1, wherein the wavelength conversion member is formed as a light tunnel.

17. The light source unit according to claim 1, comprising further:
a red light source device and a green light source device.

18. A projector comprising:
a light source unit;
a display device configured to form image light;
a light source side optical system configured to guide light from the light source unit to the display device;
a projection side optical system configured to project the image light emitted from the display device on to a screen; and
a projection control unit configured to control the display device and the light source unit,
wherein the light source unit includes:
an excitation light source configured to emit light in a first wavelength range;
a wavelength conversion member which is formed to include a luminescent material mixed therein which emits light in a second wavelength range having its wavelength peak on a longer wavelength side than a wavelength peak of the light in the first wavelength range;
a first optical filter which is provided at an output side of the wavelength conversion member from which the light in the first wavelength range and the light in the second wavelength range which pass through the wavelength conversion member emerge, wherein the first optical filter transmits the light in the first wavelength range and part of the light in the second wavelength range having wavelengths shorter than a third wavelength lying in the second wavelength range; and
a second optical filter which is provided at an incident side of the wavelength conversion member on which the light in the first wavelength range is incident, wherein the second optical filter transmits light having a wavelength shorter than a fourth wavelength which is shorter than the third wavelength.

19. A projector comprising:
a light source unit;
a display device configured to form image light;
a light source side optical system configured to guide light from the light source unit to the display device;
a projection side optical system configured to project the image light emitted from the display device on to a screen; and
a projection control unit configured to control the display device and the light source unit,
wherein the light source unit includes:
an excitation light source configured to emit light in a first wavelength range;
a wavelength conversion member which is formed to include a luminescent material mixed therein which emits light in a second wavelength range having its wavelength peak on a longer wavelength side than a wavelength peak of the light in the first wavelength range; and
a first optical filter which is provided at an output side of the wavelength conversion member from which the light in the first wavelength range and the light in the second wavelength range which pass through the wavelength conversion member emerge, wherein the first optical filter transmits the light in the first wavelength range and part of the light in the second wavelength range having wavelengths shorter than a third wavelength lying in the second wavelength range,
wherein the excitation light source includes a blue laser diode,
wherein the light in the first wavelength range includes light in the blue wavelength range,
wherein the light in the second wavelength range includes luminescent light from the luminescent material, and
wherein the wavelength conversion member has, at an incident side thereof on which the light in the first wavelength range is incident, a second optical filter configured to transmit light having a wavelength shorter than a fourth wavelength which is shorter than the third wavelength.

20. A light source unit comprising:
an excitation light source configured to emit light in a first wavelength range;
a wavelength conversion member on which the light in the first wavelength range is incident at an incident side thereof and which comprises a member formed to include a luminescent material mixed therein which emits light in a second wavelength range having its wavelength peak on a longer wavelength side than a wavelength peak of the light in the first wavelength range; and
a first optical filter which is provided at an output side of the wavelength conversion member which lies opposite to the incident side, wherein the first optical filter transmits only a light component of the light in the second wavelength range which has a wavelength shorter than a third wavelength lying in the second wavelength range.

* * * * *